(12) United States Patent
Lee et al.

(10) Patent No.: US 11,971,344 B2
(45) Date of Patent: Apr. 30, 2024

(54) ELECTRODE QUALITY EVALUATION METHOD AND ELECTRODE MANUFACTURING METHOD

(71) Applicant: LG ENERGY SOLUTION, LTD., Seoul (KR)

(72) Inventors: Hyun Sup Lee, Daejeon (KR); Kyung Mee Lee, Daejeon (KR); Hyun Jin Yang, Daejeon (KR); Kyun Il Rah, Daejeon (KR); Myung Han Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 11 days.

(21) Appl. No.: 17/915,260

(22) PCT Filed: Apr. 1, 2021

(86) PCT No.: PCT/KR2021/004068
§ 371 (c)(1),
(2) Date: Sep. 28, 2022

(87) PCT Pub. No.: WO2021/210817
PCT Pub. Date: Oct. 21, 2021

(65) Prior Publication Data
US 2023/0132960 A1 May 4, 2023

(30) Foreign Application Priority Data

Apr. 13, 2020 (KR) .................. 10-2020-0044900
Sep. 17, 2020 (KR) .................. 10-2020-0119926

(51) Int. Cl.
*G01N 21/25* (2006.01)
*G01N 21/31* (2006.01)
*H01M 4/04* (2006.01)

(52) U.S. Cl.
CPC .......... *G01N 21/251* (2013.01); *G01N 21/31* (2013.01); *H01M 4/0404* (2013.01); *H01M 4/0435* (2013.01)

(58) Field of Classification Search
CPC ... G01N 21/251; G01N 21/31; H01M 4/0404; H01M 4/0435
USPC ........................................ 356/319
See application file for complete search history.

(56) References Cited

U.S. PATENT DOCUMENTS

| 8,097,365 | B2 | 1/2012 | Iwama et al. | |
| 2008/0176144 | A1 | 7/2008 | Iwama et al. | |
| 2009/0111031 | A1* | 4/2009 | Hirose | H01M 4/622 |
| | | | | 429/338 |
| 2014/0178766 | A1 | 6/2014 | Kato et al. | |
| 2017/0190805 | A1 | 7/2017 | Yamasaki et al. | |
| 2017/0261439 | A1 | 9/2017 | Komatsu et al. | |
| 2018/0005370 | A1 | 1/2018 | Kitada et al. | |
| 2019/0233546 | A1 | 8/2019 | Yamasaki et al. | |

FOREIGN PATENT DOCUMENTS

| JP | 2000-266602 A | 9/2000 | |
| JP | 2008-010320 A | 1/2008 | |
| JP | 2008-066028 A | 3/2008 | |
| JP | 2010019813 A * | 1/2010 | ............ Y02E 60/10 |
| JP | 2011-133248 A | 7/2011 | |
| JP | 2012-156006 A | 8/2012 | |
| JP | 5318303 B1 | 10/2013 | |
| JP | 2013-239348 A | 11/2013 | |
| JP | 2013239348 A * | 11/2013 | ............ Y02E 60/10 |
| JP | 5708557 B2 | 4/2015 | |
| JP | 2017-165622 A | 9/2017 | |
| JP | 2017-183406 A | 10/2017 | |
| JP | 2018-004393 A | 1/2018 | |
| JP | 2018-049751 A | 3/2018 | |
| JP | 2020-02162 A | 2/2020 | |
| JP | 2020-041034 A | 3/2020 | |
| KR | 10-2017-0068977 A | 6/2017 | |
| KR | 10-1947565 B1 | 2/2019 | |
| WO | 2015/186667 A1 | 12/2015 | |
| WO | 2016/031434 A1 | 3/2016 | |
| WO | 2016/121687 A1 | 8/2016 | |

OTHER PUBLICATIONS

International Search Report (with partial translation) and Written Opinion dated Jul. 21, 2021, for corresponding International Patent Application No. PCT/KR2021/004068.

(Continued)

*Primary Examiner* — Uzma Alam
*Assistant Examiner* — Omar H Nixon
(74) *Attorney, Agent, or Firm* — Morgan, Lewis & Bockius LLP

(57) ABSTRACT

Provided is a method of evaluating electrode quality, which includes: providing a plurality of electrodes which include a current collector and an active material layer formed on the current collector and have not been roll-pressed; measuring a color coordinate value of the active material layer of each of the plurality of electrodes using an optical instrument and calculating an average value; and evaluating the electrodes as good products when a difference between the color coordinate value measured from the individual electrodes and the average value is no more than a predetermined value and as defective when the difference exceeds the predetermined value.

13 Claims, No Drawings

(56) References Cited

OTHER PUBLICATIONS

International Search Report issued in corresponding International Patent Application No. PCT/KR2021/004068 issued dated Jul. 21, 2021.
Written Opinion issued in corresponding International Patent Application No. PCT/KR2021/004068 issued dated Jul. 21, 2021.
Office Action issued in corresponding Japanese Patent Application No. 2022-559727 dated Oct. 16, 2023.
Extended European Search Report issued Dec. 19, 2023 for corresponding European Patent Application No. 21788267.9.

* cited by examiner

ELECTRODE QUALITY EVALUATION METHOD AND ELECTRODE MANUFACTURING METHOD

CROSS-REFERENCE TO RELATED APPLICATION

This application claims priority to and the benefit of Korean Patent Application No. 10-2020-0044900, filed on Apr. 13, 2020, and Korean Patent Application No. 10-2020-0119926, filed on Sep. 17, 2020, the disclosures of which are incorporated herein by reference in their entirety.

TECHNICAL FIELD

The present invention relates to a method of evaluating the quality of an electrode and a method of manufacturing an electrode including evaluating the quality of the electrode thereby.

BACKGROUND ART

Electrodes manufactured under the same recipe and process conditions should theoretically have the same properties, but in actual electrode manufacture, the properties may vary from batch to batch. Therefore, even among electrodes manufactured under the same conditions, there may be defective electrodes, and the defective electrodes should be identified through an electrode quality inspection.

Adhesion, thickness, and loading amount are some of the commonly known electrode quality inspection items. Among these electrode quality inspection items, adhesion is an item for filtering out electrodes detached in an electrode assembly process, electrodes peeled off in the activation process, and the like, and is a very important quality inspection item.

However, there are problems in that the adhesion of an electrode can only be evaluated after roll-pressing, and electrode quality cannot be evaluated in real time.

Therefore, there is a need to develop a method capable of filtering out defective electrodes by evaluating the quality of electrodes through property evaluation before roll-pressing.

DISCLOSURE

Technical Problem

The present invention is directed to providing a method of evaluating electrode quality which is capable of simply and quickly filtering out defective electrodes among electrodes by the simple means of measuring a color coordinate value of the electrodes before roll-pressing.

Technical Solution

One aspect of the present invention provides a method of evaluating electrode quality, which includes: providing a plurality of electrodes which include a current collector and an active material layer formed on the current collector and have not been roll-pressed; measuring a color coordinate value of the active material layer of each of the plurality of electrodes using an optical instrument and calculating an average value; and evaluating the electrodes as good products when a difference between the color coordinate value measured from the individual electrodes and the average value is no more than a predetermined value and as defective when the difference exceeds the predetermined value.

Another aspect of the present invention provides a method of manufacturing an electrode, which includes: forming an active material layer by applying a slurry including an active material, a conductive material, and a binder onto a current collector and drying, and thus manufacturing a plurality of electrodes which have not been roll-pressed; evaluating the quality of the electrodes by the above-described method; and roll-pressing an electrode evaluated as a good product.

Advantageous Effects

A method of evaluating electrode quality according to the present invention is capable of simply and quickly filtering out defective electrodes among electrodes by measuring a color coordinate value of the electrodes before roll-pressing. That is, it is possible to filter out defective electrodes even before roll-pressing, and therefore, it is possible to significantly reduce a defect rate of finished electrode products, which have been roll-pressed.

BEST MODE OF THE INVENTION

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

It will be understood that terms such as "comprises," "comprising," "includes," "including," "has" or "having," when used in the present specification, specify the presence of stated features, numbers, steps, components, or combinations thereof and do not preclude the possibility of the presence or addition of one or more other features, numbers, steps, components, or combinations thereof.

Hereinafter, the present invention will be described in detail.

<Method of Evaluating Electrode Quality>

A method of evaluating electrode quality according to the present invention includes: providing a plurality of electrodes which include a current collector and an active material layer formed on the current collector and have not been roll-pressed; measuring a color coordinate value of the active material layer of each of the plurality of electrodes using an optical instrument and calculating an average value; and evaluating the electrodes as good products when a difference between the color coordinate value measured from the individual electrodes and the average value is no more than a predetermined value and as defective when the difference exceeds the predetermined value.

When a color coordinate value of an active material layer of each of the plurality of electrodes which have not been roll-pressed is measured using the optical instrument and compared with the average value as described above, in the case of electrodes in which a difference between the color coordinate value measured from the individual electrodes and the average value is within a predetermined value range, after the electrodes are roll-pressed, since the adhesion between a current collector and an active material layer is excellent, an adhesion defect may not occur. For example, when an electrode classified as a good product according to the present invention is roll-pressed, an adhesive strength of 20 gf/20 mm or more can be secured between a current collector and an active material layer of the electrode.

According to the present invention, it is possible to simply and quickly filter out defective electrodes among electrodes by the simple means of measuring a color coordinate value of the electrodes before roll-pressing. That is, it is possible to filter out defective electrode even before roll-pressing, and therefore, it is possible to significantly reduce a defect rate of finished electrode products, which have been roll-pressed.

Hereinafter, each step of the method of evaluating electrode quality according to the present invention will be described in more detail.

Provision of Plurality of Electrodes which have not been Roll-Pressed

The present invention includes a step of providing a plurality of electrodes which include a current collector and an active material layer formed on the current collector and have not been roll-pressed.

According to the present invention, the plurality of electrodes may be produced under the same recipe and process conditions. Theoretically, electrodes manufactured under the same recipe and process conditions should have the same properties, but in actual electrode manufacturing, the properties may vary from batch to batch. Therefore, even among electrodes manufactured under the same recipe and process conditions, there may be defective electrodes, so the present inventors have implemented the present invention in order to filter out such defective electrodes simply and quickly.

The present invention does not evaluate electrodes that have been roll-pressed as in the conventional electrode quality evaluation but evaluates the quality of electrodes that have not been roll-pressed, so defective electrodes can be filtered out before roll-pressing, and a defect rate after roll-pressing can be significantly reduced.

Measurement of Color Coordinate Value of Active Material Layer of Each of Plurality of Electrodes and Calculation of Average Value The present invention includes a step of measuring a color coordinate value of the active material layer of each of the electrodes using an optical instrument and calculating an average value.

The optical instrument is an instrument including a light source and an image sensor, and when an active material layer of each of the electrodes is analyzed using the optical instrument, color information from the surface of the active material layer of each of the electrodes is converted into color coordinate values and detected. The image sensor is a device capable of converting incoming light into an electrical signal and may be, for example, a charge coupled device (CCD) sensor or a complementary metal-oxide-semiconductor (CMOS) sensor.

According to the present invention, the optical instrument may be a spectrophotometer or a colorimeter.

The color coordinate value collectively refers to numerical values expressed as coordinates in a three-dimensional color space, and, for example, the color coordinate value may be an $L^*$ value, an $a^*$ value, a $b^*$ value, a whiteness value, or a yellowness value.

According to the present invention, the color coordinate value of an active material layer may be measured by a contact colorimeter or a non-contact colorimeter. That is, the colorimeter may be a contact colorimeter or a non-contact colorimeter. In the case of using a non-contact colorimeter, since measurement is possible without direct contact with a sample, measurement is convenient, and measurement can be performed in a continuous manufacturing process.

The color coordinate value of an active material layer may be measured, for example, using a CM2600d colorimeter manufactured by Konica Minolta, Inc. Specifically, the color coordinate value may be measured using a CM2600d colorimeter manufactured by Konica Minolta, Inc., by setting the measurement mode to Specular Component Included (SCI) or Specular Component Excluded (SCE) and selecting a D65 standard light source (color temperature: 6,500 K) and the CIE 1976 10° standard observer, performing white correction, and then bringing the colorimeter into contact with a location to be measured.

Evaluation of Electrodes as Good or Defective Through Comparison of Color Coordinate Values Measured from Individual Electrodes with Average Values The present invention includes a step of evaluating the electrodes as good products when a difference between the color coordinate value measured from the individual electrodes and the average value is no more than a predetermined value and as defective when the difference exceeds the predetermined value. For example, when the predetermined value is 1 and the difference between the color coordinate value measured from the electrodes and the average value is 0.5, the electrodes are evaluated as good products, and when the difference between the color coordinate value measured from the electrodes and the average value is 1.5, the electrodes are evaluated as defective.

When the difference between the color coordinate value measured from the individual electrodes and the average value is within a predetermined value range, since excellent adhesion between a current collector and an active material layer can be secured after roll-pressing, a defect rate of finished electrode products, which have been roll-pressed, can be significantly reduced.

According to the present invention, when the color coordinate value is an $L^*$ value, the predetermined value may be 1 and preferably 0.5.

According to the present invention, when the color coordinate value is an $a^*$ value, the predetermined value may be 0.02 and preferably 0.01.

According to the present invention, when the color coordinate value is a $b^*$ value, the predetermined value may be 0.06 and preferably 0.03.

According to the present invention, when the color coordinate value is a whiteness value, the predetermined value may be 0.7 and preferably 0.3.

According to the present invention, when the color coordinate value is a yellowness value, the predetermined value may be 0.2.

Electrodes which are classified as good products as a result of the above-described comparison because differences between color coordinate values, that is, an $L^*$ value, an $a^*$ value, a $b^*$ value, a whiteness value, and a yellowness value, measured from the individual electrodes and average color coordinate values satisfy the predetermined value ranges described above may have excellent electrode quality after roll-pressing. Specifically, electrodes classified as good products according to the electrode quality evaluation method of the present invention may exhibit excellent adhesion between a current collector and an active material layer after roll-pressing. For example, an adhesive strength of 20 gf/20 mm or more can be secured between a current collector and an active material layer.

<Method of Manufacturing Electrode>

A method of manufacturing an electrode according to the present invention includes: forming an active material layer by applying a slurry including an active material, a conductive material, and a binder onto a current collector and drying, and thus manufacturing a plurality of electrodes which have not been roll-pressed; evaluating the quality of the electrodes by the above-described method; and roll-pressing an electrode evaluated as a good product.

Hereinafter, each step of the method of manufacturing an electrode according to the present invention will be described in more detail.

Manufacture of Plurality of Electrodes which have not been Roll-Pressed

The present invention includes a step of forming an active material layer by applying a slurry including an active material, a conductive material, and a binder onto a current collector and drying and thus manufacturing a plurality of electrodes which have not been roll-pressed. The active material layer may be formed on one or both sides of the current collector.

The current collector is not particularly limited as long as it does not cause a chemical change in a battery and has conductivity, and in the case of a positive electrode current collector, for example, stainless steel, aluminum, nickel, titanium, calcined carbon, aluminum or stainless steel whose surface has been treated with carbon, nickel, titanium, silver, or the like may be used, and in the case of a negative electrode current collector, for example, copper, stainless steel, aluminum, nickel, titanium, calcined carbon, copper or stainless steel whose surface has been treated with carbon, nickel, titanium, silver, or the like, an aluminum-cadmium alloy, or the like may be used.

The current collector may typically have a thickness of 3 μm to 500 μm and may have fine irregularities formed in a surface thereof to increase the adhesion of a positive electrode material or a negative electrode material. For example, the current collector may be used in any of various forms such as a film, a sheet, a foil, a net, a porous material, a foam, a non-woven fabric, and the like.

The slurry may be prepared by dissolving or dispersing an active material, a conductive material, and a binder in a solvent.

When the active material is a positive electrode active material, the positive electrode active material is a compound enabling the reversible intercalation and deintercalation of lithium and, specifically, may include a lithium composite metal oxide including lithium and one or more transition metals such as cobalt, manganese, nickel, or aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (0<Y<1), $LiMn_{2-z}Ni_zO_4$ (0<Z<2)), a lithium-nickel-cobalt-based oxide (e.g., $LiNi_{1-Y}Co_{Y1}O_2$ (0<Y<1)), a lithium-manganese-cobalt-based oxide (e.g., $LiCo_{1-Y2}Mn_{Y2}O_2$ (0<Y2<1), $LiMn_{2-z}Co_{Z1}O_4$ (0<Z1<2)), a lithium-nickel-manganese-cobalt-based oxide (e.g., $Li(Ni_p Co_q Mn_{r1})O_2$ (0<p<1, 0<q<1, 0<r1<1, and p+q+r1=1), $Li(Ni_{p1}Co_{q1}Mn_{r2})O_4$ (0<p1<2, 0<q1<2, 0<r2<2, and p1+q1+r2=2)), or a lithium-nickel-cobalt-transition metal (M) oxide (e.g., $Li(Ni_{p2} Co_{q2} Mn_{r3}M_{S2})O_2$ (M is selected from the group consisting of Al, Fe, V, Cr, Ti, Ta, Mg and Mo, and p2, q2, r3 and s2 represent an atomic fraction of each independent element, and satisfy 0<p2<1, 0<q2<1, 0<r3<1, 0<s2<1, and p2+q2+r3+s2=1)), and these compounds may be used alone or in combination of two or more thereof.

When the active material is a negative electrode active material, various negative electrode active materials used in the art, for example, a carbon-based negative electrode active material, a silicon-based negative electrode active material, a metal alloy, and the like may be used as the negative electrode active material.

As the carbon-based negative electrode active material, various carbon-based negative electrode active materials used in the art, for example, graphite-based materials such as natural graphite, artificial graphite, and Kish graphite, pyrolytic carbon, mesophase pitch-based carbon fiber, mesocarbon microbeads, mesophase pitches, high-temperature calcined carbon such as petroleum or coal tar pitch-derived cokes, soft carbon, hard carbon, and the like may be used. The shape of the carbon-based negative electrode active material is not particularly limited, and materials having various shapes, such as amorphous materials, platy materials, scaly materials, spherical materials, or fibrous materials, may be used.

The silicon-based negative electrode active material may include one or more selected from the group consisting of metal silicon (Si), silicon oxide ($SiO_x$, here, 0<x<2), silicon carbide (SiC), and an Si—Y alloy (here, Y is an element selected from the group consisting of an alkali metal, an alkaline earth metal, a group 13 element, a group 14 element, a transition metal, a rare earth element, and a combination thereof and is not Si). The element Y may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The active material may be included in an amount of 80% by weight to 99% by weight, more specifically 85% by weight to 98% by weight, based on the total weight of the active material layer. When the content of the active material is within the above range, excellent capacity characteristics and electrochemical characteristics can be obtained.

The conductive material is used for imparting conductivity to an electrode and can be used without particular limitation as long as it does not cause a chemical change in a battery being manufactured and has electron conductivity. Specific examples thereof include: graphite such as natural graphite or artificial graphite; carbon black such as acetylene black, Ketjen black, channel black, furnace black, lamp black, or thermal black; a carbon-based material such as a carbon fiber; a metal powder or metal fiber such as copper, nickel, aluminum, or silver; a conductive whisker such as zinc oxide or potassium titanate; a conductive metal oxide such as titanium oxide; and a conductive polymer such as a polyphenylene derivative, which may be used alone or in a combination of two or more thereof.

The conductive material may be included in an amount of 1% by weight to 30% by weight based on the total weight of the positive electrode active material layer.

The binder serves to improve adhesion between the active material particles and between the active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, styrene-butadiene rubber (SBR), fluororubber, or various copolymers thereof, which may be used alone or in a combination of two or more thereof.

The binder may be included in an amount of 1% by weight to 30% by weight based on the total weight of the positive electrode active material layer.

The solvent may be a solvent commonly used in the art, for example, dimethyl sulfoxide (DMSO), isopropyl alcohol, N-methylpyrrolidone (NMP), acetone, water, or the like, and these may be used alone or in a combination of two or more thereof. The usage amount of the solvent is not particularly limited and is sufficient if the viscosity of the slurry can be adjusted to an appropriate level in consideration of the coating thickness, production yield, and workability of the slurry, and the like.

According to the present invention, an active material layer may be formed by applying a slurry including an active material, a conductive material, and a binder onto a current collector in a loading amount of 0.005 g/cm$^2$ to 0.050 g/cm$^2$ and drying the same. The loading amount of the slurry is preferably 0.005 g/cm$^2$ to 0.030 g/cm$^2$ and more preferably 0.005 g/cm$^2$ to 0.025 g/cm$^2$. When the loading amount of the slurry is within the above range, an active material layer having an appropriate thickness can be formed on the current collector.

According to the present invention, the drying may be carried out with a total heat amount of 1,000 kW to 1,500 kW. The drying is preferably carried out with a total heat amount of 1,100 kW to 1,400 kW and more preferably with a total heat amount of 1,200 kW to 1,400 kW. When the drying is carried out with a total heat amount satisfying the above range, since the drying is achieved to the extent that a defect is not caused in electrodes, the quality of the electrodes can be excellent.

According to the present invention, the active material layer may have a thickness of 100 μm to 500 μm. The thickness of the active material layer is preferably 200 μm to 500 μm and more preferably 250 μm to 450 μm. When the thickness of the active material layer is within the above range, the performance of the active material layer can be maximized, and at the same time, the defect rate of an electrode can be significantly reduced.

Evaluation of Electrode Quality

The method of manufacturing an electrode according to the present invention includes a step of evaluating the quality of the electrode by the above-described method.

That is, the method includes a step of measuring a color coordinate value of an active material layer of each of the manufactured plurality of electrodes (electrodes which have not been roll-pressed) using an optical instrument and calculating an average value, and evaluating the electrodes as good products when a difference between the color coordinate value measured from the individual electrodes and the average value is no more than a predetermined value and as defective when the difference exceeds the predetermined value. Details of this step are the same as described above.

Roll-Pressing of Electrodes Evaluated as Good Products

The present invention includes a step of roll-pressing electrodes evaluated as good products and thus forming electrodes.

As described above, electrodes evaluated as good products according to the electrode quality evaluation method of the present invention can be used for manufacturing a lithium secondary battery after roll-pressing, and in this case, the defect rate of the lithium secondary battery may be significantly low. The lithium secondary battery can be usefully applied to portable devices such as mobile phones, laptop computers, and digital cameras and electric cars such as hybrid electric vehicles (HEVs).

Modes of the Invention

Hereinafter, exemplary embodiments of the present invention will be described in detail so that those of ordinary skill in the art can easily implement the present invention. However, the present invention can be implemented in various different forms and is not limited to the embodiments described herein.

Preparation Example

A slurry was prepared by adding, to 50 parts by weight of water, 10 parts by weight of natural graphite, 35 parts by weight of artificial graphite, 0.5 parts by weight of a conductive material, 3.5 parts by weight of SBR, and 1 part by weight of CMC.

An active material layer having a thickness of 340 μm was formed by applying the slurry at a loading amount of 0.015 g/cm$^2$ on one side of a copper current collector having a thickness of 8 μm and drying the same with a total heat amount of 1,300 kW, and an active material layer was formed on the other side of the current collector under the same recipe and process conditions, and thus an electrode was manufactured.

Seven electrodes (Electrodes A to G) were manufactured by the above-described method.

Example: Evaluation of Electrode Quality

Color coordinate values such as an L* value, an a* value, a b* value, a whiteness value, and a yellowness value were measured from active material layers on both sides (one side and the other side) of each of Electrodes A to G using a CM2600d colorimeter manufactured by Konica Minolta, Inc, by setting the measurement mode to SCI and selecting a D65 standard light source (color temperature: 6,500 K) and the CIE 1976 10° standard observer, performing white correction, and then bringing the colorimeter into contact with a location to be measured, and the results are shown in the following Table 1.

TABLE 1

| Electrode | L* | | a* | | b* | | Whiteness | | Yellowness | |
|---|---|---|---|---|---|---|---|---|---|---|
| | One side | The other side | One side | The other side | One side | The other side | One side | The other side | One side | The other side |
| A | 39.19 | 38.71 | 0.61 | 0.60 | 0.26 | 0.23 | 11.79 | 11.48 | 2.30 | 2.17 |
| B | 39.34 | 38.93 | 0.61 | 0.59 | 0.25 | 0.23 | 11.92 | 11.66 | 2.24 | 2.13 |
| C | 39.37 | 38.25 | 0.60 | 0.60 | 0.24 | 0.17 | 11.97 | 11.25 | 2.17 | 1.95 |
| D | 39.20 | 38.48 | 0.61 | 0.60 | 0.24 | 0.19 | 11.84 | 11.38 | 2.20 | 2.01 |
| E | 39.07 | 38.79 | 0.60 | 0.60 | 0.25 | 0.18 | 11.71 | 11.65 | 2.24 | 1.94 |
| F | 39.31 | 38.77 | 0.60 | 0.59 | 0.25 | 0.21 | 11.89 | 11.58 | 2.24 | 2.04 |
| G | 39.22 | 37.21 | 0.60 | 0.63 | 0.22 | 0.13 | 11.89 | 10.58 | 2.11 | 1.80 |
| Average value | 39.24 | 38.45 | 0.60 | 0.60 | 0.24 | 0.20 | 11.86 | 11.37 | 2.21 | 2.01 |

TABLE 2

| Electrode | \|L*-average value\| | | \|a*-average value\| | | \|b*-average value\| | | \|Whiteness-average value\| | | \|Yellowness-average value\| | |
|---|---|---|---|---|---|---|---|---|---|---|
| | One side | The other side | One side | The other side | One side | The other side | One side | The other side | One side | The other side |
| A | 0.05 | 0.26 | 0.01 | 0 | 0.02 | 0.03 | 0.07 | 0.11 | 0.09 | 0.16 |
| B | 0.1 | 0.48 | 0.01 | 0.01 | 0.01 | 0.03 | 0.06 | 0.29 | 0.03 | 0.12 |
| C | 0.13 | 0.2 | 0 | 0 | 0 | 0.03 | 0.11 | 0.12 | 0.04 | 0.06 |
| D | 0.04 | 0.03 | 0.01 | 0 | 0 | 0.01 | 0.02 | 0.01 | 0.01 | 0 |
| E | 0.17 | 0.34 | 0 | 0 | 0.01 | 0.02 | 0.15 | 0.28 | 0.03 | 0.07 |
| F | 0.07 | 0.32 | 0 | 0.01 | 0.01 | 0.01 | 0.03 | 0.21 | 0.03 | 0.03 |
| G | 0.02 | 1.24 | 0 | 0.03 | 0.02 | 0.07 | 0.03 | 0.79 | 0.1 | 0.21 |

Referring to Table 2, in the case of Electrodes A to F, since a difference between a color coordinate value of active material layers on both sides of each of the electrodes and an average value was 1 or less when the color coordinate value was L*, 0.02 or less when the color coordinate value was a*, 0.06 or less when the color coordinate value was b*, 0.7 or less when the color coordinate value was whiteness, and 0.2 or less when the color coordinate value was yellowness, Electrodes A to F were evaluated as good products.

On the other hand, in the case of Electrode G, since differences between all color coordinate values of an active material layer on "the other side" of the electrode and average values did not satisfy predetermined value ranges, Electrode G was evaluated as defective.

Experimental Example: Evaluation of Adhesion

Each of Electrodes A to G was roll-pressed, and the roll-pressed electrode was attached to a glass slide using double-sided tape. Subsequently, the electrode was pulled at an angle of 90° at a speed of 100 mm/min using a universal testing machine (UTM) (manufactured by Lloyd), and a force required to peel off the electrode from the glass slide was measured. The results are shown in the following Table 3.

TABLE 3

| Tested electrode | Adhesive strength (gf/20 mm) | | Evaluation |
|---|---|---|---|
| | One side | The other side | Normal |
| A | 32 | 24 | Normal |
| B | 33 | 23 | Normal |
| C | 30 | 24 | Normal |
| D | 31 | 23 | Normal |
| E | 29 | 25 | Normal |
| F | 32 | 26 | Normal |
| G | 31 | 15 | Adhesion defect on the other side |

As shown in Table 3, in the case of Electrodes A to F, which were classified as good products according to the electrode quality evaluation method of the present invention, it can be seen that an excellent adhesive strength of 20 gf/20 mm or more was exhibited in the electrodes after roll-pressing.

On the other hand, in the case of Electrode Gin which differences between all color coordinate values of an active material layer on "the other side" of the electrode and average values did not satisfy predetermined value ranges, it can be seen that the electrode had an adhesive strength of 15 gf/20 mm on "the other side" the electrode after roll-pressing and thus did not have satisfactory properties to be used as an electrode. That is, it can be seen that adhesion is poor.

Therefore, according to the present invention, it can be seen that it is possible to simply and quickly filter out defective electrodes by the simple means of measuring a color coordinate value of electrodes before roll-pressing. That is, it can be seen that it is possible to filter out defective electrodes even before roll-pressing, and therefore, it is possible to significantly reduce a defect rate of finished electrode products even before roll-pressing.

The invention claimed is:

1. A method of evaluating electrode quality, comprising:
providing a plurality of electrodes which include a current collector and an active material layer formed on the current collector and have not been roll-pressed;
measuring a color coordinate value of the active material layer of each of the plurality of electrodes using an optical instrument and calculating an average value; and
evaluating the electrodes as good products when a difference between the color coordinate value measured from the individual electrodes and the average value is no more than a predetermined value and as defective when the difference exceeds the predetermined value.

2. The method of claim 1, wherein the color coordinate value is an L* value, and the predetermined value is 1.

3. The method of claim 1, wherein the color coordinate value is an a* value, and the predetermined value is 0.02.

4. The method of claim 1, wherein the color coordinate value is a b* value, and the predetermined value is 0.06.

5. The method of claim 1, wherein the color coordinate value is a whiteness value, and the predetermined value is 0.7.

6. The method of claim 1, wherein the color coordinate value is a yellowness value, and the predetermined value is 0.2.

7. The method of claim 1, wherein the plurality of electrodes are manufactured under the same recipe and process conditions.

8. The method of claim 1, wherein the optical instrument is a spectrophotometer or a colorimeter.

9. The method of claim 8, wherein the colorimeter is a contact colorimeter or a non-contact colorimeter.

10. A method of manufacturing an electrode, comprising:
forming an active material layer by applying a slurry including an active material, a conductive material, and a binder onto a current collector and drying, and thus manufacturing a plurality of electrodes which have not been roll-pressed;
evaluating the quality of the electrodes by the method of claim 1; and
roll-pressing an electrode evaluated as a good product.

11. The method of claim 10, wherein the slurry is applied in a loading amount of 0.005 g/cm$^2$ to 0.050 g/cm$^2$.

12. The method of claim 10, wherein the drying is carried out with a total heat amount of 1,000 kW to 1,500 kW.

13. The method of claim 10, wherein the active material layer has a thickness of 100 μm to 500 μm.

* * * * *